US005560205A

United States Patent [19]

Huebner

[11] Patent Number: 5,560,205

[45] Date of Patent: Oct. 1, 1996

[54] ATTENUATION OF FLUID BORNE NOISE

[75] Inventor: Robert J. Huebner, Peoria, Ill.

[73] Assignee: Caterpillar Inc., Peoria, Ill.

[21] Appl. No.: 360,858

[22] Filed: Dec. 21, 1994

[51] Int. Cl.[6] .......... F16D 31/02

[52] U.S. Cl. .......... 60/469; 60/494

[58] Field of Search .......... 60/469, 413, 415, 60/494, 449, 450; 417/540, 312, 300, 280; 138/30, 45, 46; 181/226, 225

[56] References Cited

U.S. PATENT DOCUMENTS

| | | | |
|---|---|---|---|
| 3,606,243 | 9/1971 | Ichiryu et al. . | |
| 3,660,979 | 5/1972 | Kamakura et al. . | |
| 3,956,969 | 5/1976 | Hein . | |
| 4,063,824 | 12/1977 | Baker et al. | 417/312 X |
| 4,103,489 | 8/1978 | Fletcher et al. | 60/449 X |
| 4,132,506 | 1/1979 | Dantlgraber | 60/450 X |
| 4,292,805 | 10/1981 | Acheson | 60/450 |
| 4,801,245 | 1/1989 | de Haas et al. | 417/540 X |
| 4,979,441 | 12/1990 | Welch et al. | 417/540 X |
| 5,085,051 | 2/1992 | Hirata | 60/450 X |
| 5,168,703 | 12/1992 | Tobias | 60/418 |
| 5,193,885 | 3/1993 | Yamaguchi et al. | 303/87 |
| 5,199,856 | 4/1993 | Epstein et al. | 417/540 X |
| 5,355,676 | 10/1994 | Inokuchi | 60/413 |
| 5,475,976 | 12/1995 | Phillips | 60/469 X |

FOREIGN PATENT DOCUMENTS

| | | | |
|---|---|---|---|
| 2525150 | 12/1976 | Germany | 60/413 |
| 4302977 | 3/1994 | Germany | 417/540 |
| 4243075 | 6/1994 | Germany | 417/540 |
| 57-177406 | 11/1982 | Japan | 60/413 |

OTHER PUBLICATIONS

Diesel Progress Engines & Drives, "The dB(A)s of Hydraulic System Noise", R. Henke, Jul. 1994, pp. 42–26.

SAE paper No. 801006, "A Ripple–Free Gear Pump Using Controlled Leakage", Headrick & King, 1980, Fluid Power Research Center.

*Primary Examiner*—John E. Ryznic

*Attorney, Agent, or Firm*—J. W. Burrows

[57] ABSTRACT

In many hydraulic systems, fluid borne noise is generated during operation due to the effects of the hydraulic pump. This fluid borne noise is many times transmitted to the hydraulic valves, hydraulic lines, and other structures that valves and lines are mounted on. The structure then emits vibrations that create the largest portion of the system air borne noise. In the subject invention, an apparatus is provided for the attenuation of fluid borne noise in a hydraulic system. The apparatus includes a fluid vessel having a volumetric space of a predetermined size located in the system generally adjacent a pump and a flow restrictor located in the system downstream of the fluid vessel. In the subject arrangement, the flow restrictor may be adjustable in response to various system parameters so that the fluid borne noise is effectively controlled over wide ranges of system pressures, pump drive speeds, and pump displacements. By reducing the fluid borne noise in the hydraulic system, the associated air borne noise that is created by various components that are associated with the hydraulic system is further attenuated.

6 Claims, 1 Drawing Sheet

ATTENUATION OF FLUID BORNE NOISE

TECHNICAL FIELD

This invention relates generally to the attenuation of noise in a machine having hydraulic components and, more particularly, to the apparatus for the attenuation of the fluid borne noise.

BACKGROUND OF THE INVENTION

It is well known that some of the noise generated in machines is attributed to hydraulic noise which may be transmitted in various forms such as air borne, fluid borne, and/or structure borne. Attempts have been made in the past to control hydraulic noise by enclosing hydraulic systems in an acoustical enclosure. However, this is not feasible in many systems because some of the hydraulic components and the structures that they are mounted to are separated by significant distances. One of the primary generators of hydraulic noise in a hydraulic system is the hydraulic pump. The hydraulic pump excites fluid borne noise which is transmitted to valves, lines, and so forth and then to the structures of those components or the structures on which they are mounted. These structures then emit vibrations that create the largest portion of the overall air borne noise attributed to the hydraulic system. Therefore, reduction of fluid borne noise is a key to the reduction in the noise generated in the hydraulic system.

Positive displacement hydraulic pumps or motors, due to their geometry, port timing, and speed, inherently produce a flow ripple that excites pressure waves that are known as fluid borne noise. This is true of most, if not all, types of positive displacement vane, piston, or gear pumps or motors. For illustration purposes only, the piston pump is being used to better illustrate that which causes fluid borne noise. It is recognized that the same principles apply with respect to the other types of positive displacement pumps. The total flow output of the hydraulic piston pump is geometrically proportional to the sum of the velocities of the individual pistons between the bottom dead center (BDC) and the top dead center (TDC) positions. The uneven delivery of fluid flow resulting from the sum of the velocities not being constant is one of the inherent characteristics of a pump contributing to the flow ripple. The second source of flow ripples is due to pressure changes that occur in the piston cavity near bottom dead center when the pump is operating at some outlet pressure other than a low pressure that is equal to inlet pressure. When the piston reaches bottom dead center, the piston cavity is at inlet pressure. Until the pressure in the piston cavity reaches discharge pressure, the velocity of that piston does not contribute to the pump's output flow. Also, if the pressure in the piston cavity is not the same as the discharge pressure when the piston cavity enters the discharge port, there can be an inrush or outrush of flow between the piston cavity and the discharge cavity, causing a disturbance in the pump's output flow. The amount and rate of flow change near bottom dead center varies depending on the geometry of the cavities, the displacement of the pump, the port configuration, the pump speed and the output pressure. Thus, the flow ripple depends not only on the geometric sum of the piston velocities, but also on the pressure at which the pump is operating, the pump displacement, the pump porting, and the speed of the pump. By reducing or cancelling the flow ripple, the fluid borne noise excited by the pump is substantially reduced along with the structure borne noise and the air borne noise that are associated with hydraulic components or structures downstream thereof.

Various attempts have been made to reduce fluid borne noise in hydraulic systems by installing various mufflers and/or dampers. Likewise, port timing is sometimes changed within the pump in an attempt to modify the pressure ripple. Even though some of these attempts are proven to be partially successful, they are normally only successful when operating within narrow pressure, speed and displacement ranges of the pump. However, when systems are being operated over wide ranges of speed, displacement and pressure, these earlier arrangements have proven to be inadequate. It is desirable, therefore, to provide a system that is effective to control the fluid borne noise therein when operating at different speeds, pressures, and/or displacements.

The present invention is directed to overcoming one or more of the problems as set forth above.

DISCLOSURE OF THE INVENTION

In one aspect of the present invention, an apparatus is provided for the attenuation of fluid borne noise in a hydraulic system having a hydraulic pump that is drivingly connected by a drive mechanism to a power source, such as an engine. The apparatus includes a fluid vessel having a volumetric space of a predetermined size and when in use is located in the hydraulic system generally adjacent the hydraulic pump and a flow restrictor of a predetermined size that, when in use, is located in the hydraulic system downstream of the fluid vessel.

The intent of the present invention is to substantially reduce the flow ripple produced by the pump, thus maintaining a generally uniform average flow to the rest of the system. Furthermore, the subject invention can be retrofitted into existing hydraulic systems. The reduction and/or cancellation of the flow ripple is accomplished by providing a fluid vessel generally adjacent the pump that has a flow volume which can absorb and release fluid as the flow variation from the pump tries to suddenly increase and decrease flow through the flow restrictor that is located downstream thereof. This effectively provides a more nearly constant flow rate downstream of the flow restrictor.

BEST MODE FOR CARRYING OUT THE INVENTION

Figure 1:
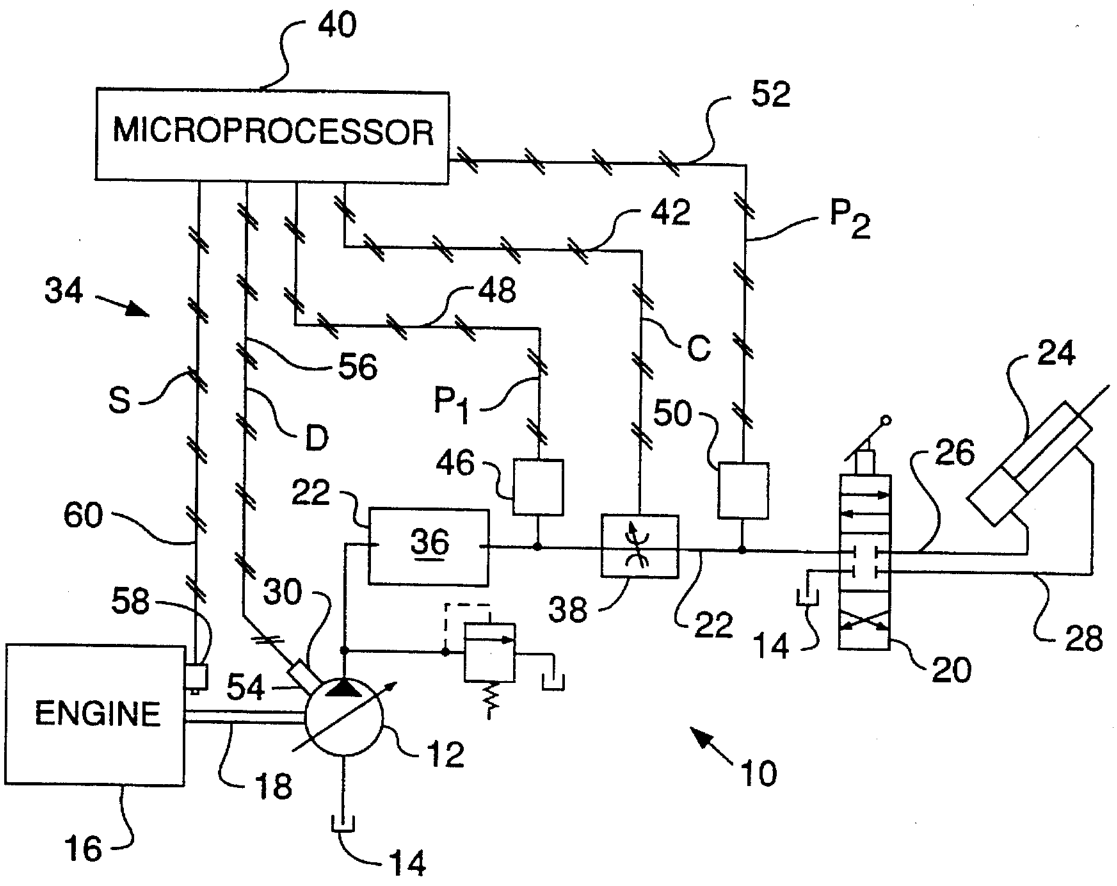
FIG. 1 is a partial diagrammatic and partial schematic representation of a hydraulic system incorporating an embodiment of the present invention.

Referring to the drawing, a hydraulic system 10 is illustrated and includes a hydraulic pump 12 adapted to receive fluid from a reservoir 14 and is drivingly connected to a variable speed engine 16 by a drive mechanism 18. The hydraulic system 10 also includes a directional control valve 20 connected to the hydraulic pump 12 by a conduit 22 and connected to a cylinder 24 having a load "L" by respective conduits 26,28. It is recognized that the cylinder 24 could be any type of actuator such as, for example, a fluid motor.

The hydraulic pump 12 is a variable displacement pump having a displacement control 30 attached thereto for control of fluid flow therefrom. It is recognized that the pump 12 could be a fixed displacement pump of various types, such as a piston, vane, or gear type without departing from the essence of the invention. As is well known, hydraulic pumps inherently produce flow ripples during their normal operation. These flow ripples are normally produced as a direct result of the pump geometry, port timing, outlet pressure and/or rotational speed.

An apparatus 34 for the attenuation of fluid borne noise is provided in the hydraulic system 10. The apparatus 34 includes a fluid vessel 36 having a volumetric space of a predetermined size, a flow restrictor 38, and a microprocessor 40. The fluid vessel 36 is located in the conduit 22 of the hydraulic system 10 generally adjacent the pump 12. Even though the fluid vessel 36 is indicated as being generally located adjacent the pump, it is recognized that the fluid vessel could be spaced from the pump 12 without departing from the essence of the invention. Generally, the larger the volume of the fluid vessel 36 and the greater the restriction of the flow restrictor 38, the smaller the flow variation in the system. However, system losses that are permissible and system size restraints will influence design of the attenuation mechanism. As an example and for illustrative purposes, the volumetric space of the fluid vessel 36 is in the range of 6 to 7 liters (1.56 to 1.82 gallons). In the subject arrangement, it is contemplated that the fluid vessel is circular in cross section and has a length that is 1 to 2½ times as long as the diameter thereof. However, it is recognized that the cross section of the fluid vessel could be of any configuration and the length could vary accordingly.

The flow restrictor 38 is located in the conduit 22 of the fluid system 10 downstream of the fluid vessel 36. As illustrated, the flow restrictor 38 is an adjustable orifice that is selectably variable to control the size thereof. It is recognized that, in some systems, the flow restrictor 38 could be a fixed flow restrictor. However, in the subject arrangement, the flow restrictor is selectably adjustable in response to receipt of an electrical control signal "C" through an electrical line 42.

The microprocessor 40 receives signals from various system parameters and processes the various system parameters to produce the electrical signal "C" which controls the size of the flow restrictor 38. A first pressure sensor 46 is connected to the conduit 22 at a location between the fluid vessel 36 and the flow restrictor 38. The first pressure sensor 46 is operative to deliver a first electrical signal "$P_1$" to the microprocessor 40 through an electrical line 48. A second pressure sensor 50 is provided and connected to the conduit 22 downstream of the flow restrictor 38. The second pressure sensor 50 is operative to deliver a second electrical signal ($P_2$) to the microprocessor 40 through an electrical line 52.

As an alternative, the apparatus may include a pump displacement sensor 54 disposed in the displacement control 30 of the pump 12. The pump displacement sensor 54 is operative to sense the displacement of the pump 12 and delivers a third electrical signal "D" to the microprocessor 40 through an electrical line 56. A pump drive speed sensor 58 is provided in the system and operative to sense the rotational speed of the pump drive mechanism 18. The pump drive speed sensor 58 delivers a fourth electrical signal "S" to the microprocessor 40 through an electrical line 60.

It is recognized that various forms of the subject apparatus for the attenuation of fluid borne noise could be utilized without departing from the essence of the invention. For example, a differential pressure sensor could be used in place of the first and second pressure sensors 46,50 to determine the pressure drop across the flow restrictor 38. Also, the fluid vessel 36 could be a vessel having a trapped volume of a compressive material therein with an expandable conduit passing therethrough. The trapped volume of compressible material would then serve as the cushion volume. Consequently, as the fluid passes through the conduit 22 and subsequently through the expandable conduit, the fluid would act on the trapped volume of compressible material to absorb any pressure increases attributed to the flow ripple and subsequently expel such pressure increases back into the fluid in the conduit 22 as the system pressure attributed to the flow ripple decreases.

INDUSTRIAL APPLICABILITY

In the operation of a typical hydraulic system, the hydraulic pump provides fluid through the conduit 22 and the control valve 20 to actuate the hydraulic cylinder 24. The pressure required in this system is dependent on the resistance created by the load "L" on the cylinder 24. When there is no load on the cylinder 24, the system pressure is low and thus would result in a pump flow that is relatively constant. As the system pressure increases, the variation in flow from the pump changes. This variation in the flow output from the hydraulic pump results in the formation of a pressure wave which is referred to as fluid borne noise. In order to offset this fluid borne noise, the variation in flow from the hydraulic pump must be reduced and/or neutralized.

Referring to the drawing, during operation, flow from the pump 12 passes through the fluid vessel 36 and through the flow restrictor 38 to the directional control valve 20. Upon selective operation of the control valve 20, the pressurized fluid in the conduit 22 is directed to the cylinder 24 in a well known manner. The flow restrictor 38 is set at a predetermined size in order to produce a differential pressure thereacross for a particular flow and/or a particular system operating pressure. As the pump flow varies cyclically, the flow through the flow restrictor 38 tries to vary accordingly. However, flow through the flow restrictor 38 cannot change without a change in the pressure differential thereacross. In order for the pressure differential across the flow restrictor 38 to change the volume of fluid upstream thereof must be compressed or expanded to change the pressure. Hence part of the pump flow variation induces compression or expansion of the fluid in the pressure vessel 36 and only a small fraction of the flow variation actually passes through the flow restrictor 38 to the system downstream.

In order to better illustrate the anticipated advantages of the subject invention, consider a system utilizing a 250 milliliter (approximately 15 cubic inches) pump operating at 2000 rpm at an operating system pressure of 36,000 kPa (approximately 5200 psi). When operating at full displacement, the pump flow variation could be in the magnitude of 185 liters per minute (48.8 gallons per minute) which is approximately a 37 percent variation in the pump flow. When incorporating the subject fluid vessel 36 and the flow restrictor 38 into the system, the system flow variation is reduced to approximately 50 liters per minute (approximately 13.2 gallons per minute) which is approximately a 10 percent variance in the system flow. The flow restrictor 38 is sized such that the differential pressure thereacross ranges from approximately 1490 kPa (216 psi) to 1800 kPa (260 psi). In this particular relationship, the upper end of the range of differential pressure across the flow restrictor 38 is based on approximately 5 percent of the operating system pressure.

With the sensing of pressure upstream of the flow restrictor 38 and sensing of pressure downstream of the flow restrictor 38 and delivering of the signals "$P_1$,$P_2$" to the microprocessor 40, the microprocessor processes the pressure signals and delivers an electrical control signal "C" to the flow restrictor 38 to change the effective size of the flow restrictor 38 to maintain a differential pressure across the flow restrictor in the range generally set forth with respect to the above-noted example. By selecting the highest differential pressure as approximately 5 percent of the operating system pressure, the system flow variation can generally be maintained below 10 percent. For instance, in the above-noted example, if the pump 12 is being operated at one-half displacement, without the subject invention, the pump flow variation is in the magnitude of 154 liters per minute (40.5 gallons per minute) which is approximately a 61.4 percent variation in the pump flow. When utilizing the subject invention, the system flow variation is reduced to approximately 18.5 liters per minute (4.9 gallons per minute) which is approximately a 7 percent variation in system flow. By selecting the pressure upstream and downstream of the flow restrictor 38, and using the largest differential pressure across the flow restrictor as approximately 5 percent of the operating system pressure, the differential pressure across the flow restrictor is maintained between 1543 kPa (223 psi) and 1800 kPa (260 psi).

When the operating system pressure of the above-noted pump is at, for example, 10,000 kPa (1450 psi), the pump flow variation at maximum displacement is in the order of 71.6 liters per minute (18.9 gpm) which is approximately 14.3 percent variation in pump flow when not utilizing the subject invention. When utilizing the subject invention, the system flow variation would be in the order of 37 liters per minute (9.8 gallons per minute) which is approximately a 7.4 percent variation in system flow. By utilizing the largest differential pressure across the flow restrictor being in the order of approximately 5 percent of system operating pressure, the size of the flow restrictor 38 is controlled to maintain the differential pressure across the flow restrictor 38 in the order of 429 kPa (62 psi) through 500 kPa (72 psi). In the subject example, if the pump is operating at 10,000 kPa and half displacement while utilizing the subject invention, the system flow variation can be reduced from approximately 23.8 to approximately 6.1 percent.

In each of the examples noted, by sensing the pressure in the system upstream and downstream of the flow restrictor 38, and controlling the size of the flow restrictor accordingly, the variation in pump flow can be substantially reduced. Consequently, the reduction in flow variation is directly associated with the reduction in fluid borne noise. The overall reduction in pump flow variation can be enhanced by increasing the size of the fluid vessel 36. However, design limitations and/or space limitations can affect any desire to increase the size of the fluid vessel 36. Furthermore, as previously noted, it is possible to use some material in the fluid vessel 36 other than the hydraulic oil if the bulk modulus of that material is lower than the bulk modulus of the oil and can survive when being subjected to such high frequencies. Furthermore, the other material must be compatible with the oil being used therein.

In some systems, it may be desirable to adjust the size of the fluid restrictor 38 by sensing the displacement of the pump and the drive speed of the pump to determine the total flow output from the pump to the system. In this type of arrangement, the microprocessor 40 would receive the respective pump displacement signal "D" and the pump drive speed signal "S" and calculate the magnitude of the control signal "C" being delivered to the flow restrictor 38 to adjust the size thereof according to the signals received. By calculating the pump's flow rate from the pump drive input speed and the displacement of the pump and comparing it to known principles, a predetermined orifice size can be determined and adjusted accordingly so that the differential pressure across the flow restrictor 38 would remain relatively constant for all flow rates and downstream pressures thereof. This mathematical calculation would generally be based on the principle that pressure drop across an orifice varies as the square of the flow.

From a review of the above, it should be apparent that the variation in pump flow to the system can readily be reduced by using the subject fluid vessel 36 in combination with the flow restrictor 38. Furthermore, in systems operating at various system pressures and/or various engine speeds and/or pump displacements, the flow restrictor 38 can be adjusted to maintain very low variations in the system flow by either sensing the pressure upstream and downstream of the flow restrictor 38 or by sensing a combination of the pump drive speed and the pump displacement.

Other aspects, objects and advantages of the invention can be obtained from a study of the drawings, the disclosure and the appended claims.

I claim:

1. Apparatus for the attenuation of fluid borne noise in a hydraulic system having a hydraulic pump that is drivingly connected by a drive mechanism to a power source, comprising:

a fluid vessel having a volumetric space of a predetermined size and, when in use, is located in the hydraulic system generally adjacent the hydraulic pump;

a selectively variable flow restrictor, when in use, located in the hydraulic system downstream of the fluid vessel;

a microprocessor operable to receive electrical signals representative of various system parameters and deliver an electrical control signal therefrom to selectively control the size of the variable flow restrictor; and a first pressure sensor, when in use, connected in the system between the fluid vessel and the flow restrictor and operative to deliver an electrical signal therefrom representative of the pressure therein to the microprocessor and a second pressure sensor, when in use, connected in the system downstream of the flow restrictor and operative to deliver an electrical signal therefrom representative of the pressure therein to the microprocessor, the microprocessor processes the electrical signals from the first and second pressure sensors and delivers the electrical control signal to the variable flow restrictor to control the differential pressure thereacross.

2. The apparatus of claim 1 wherein the volumetric size of the fluid vessel is in the range of 6 liters to 7 liters.

3. The apparatus of claim 2 wherein the fluid vessel is circular in cross section having a predetermined diameter and the length thereof is in the range of 1 to 2½ times as long as the diameter.

4. Apparatus for the attenuation of fluid borne noise in a hydraulic system having a hydraulic pump that is drivingly connected by a drive mechanism to a power source, comprising:

a fluid vessel having a volumetric space of a predetermined size and, when in use, is located in the hydraulic system generally adjacent the hydraulic pump;

a selectively variable flow restrictor, when in use, located in the hydraulic system downstream of the fluid vessel;

a microprocessor operable to receive electrical signals representative of various system parameters and deliver an electrical control signal therefrom to selectively control the size of the variable flow restrictor; and a pump drive speed sensor operative, when in use, to sense the rotational speed of the pump and deliver an electrical signal representative of the pump speed to the microprocessor and a pump displacement sensor operative, when in use, to sense the displacement of the pump and deliver an electrical signal representative of the pump's displacement to the microprocessor, the microprocessor processes the electrical signals from the pump displacement sensor and the pump drive speed sensor and delivers the electrical control signal to the variable flow restrictor to control the differential pressure thereacross.

5. The apparatus of claim 4 wherein the volumetric size of the fluid vessel is in the range of 6 liters to 7 liters.

6. The apparatus of claim 5 wherein the fluid vessel is circular in cross section having a predetermined diameter and the length thereof is in the range of 1 to 2½ times as long as the diameter.

* * * * *